Figure 5:
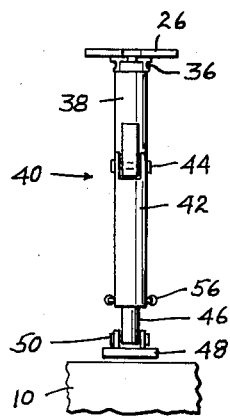

Jan. 10, 1961          J. KEENER          2,967,492
TRAILER HITCH FOR A PIGGY-BACK RAILROAD FLAT CAR
Filed July 27, 1959          2 Sheets-Sheet 1
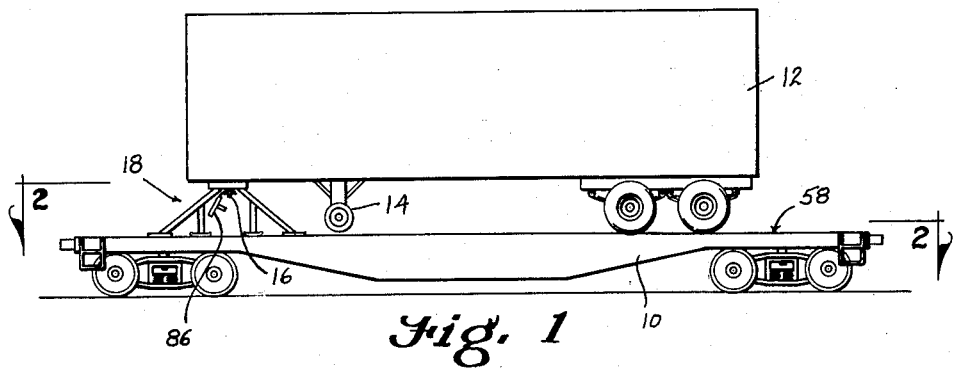
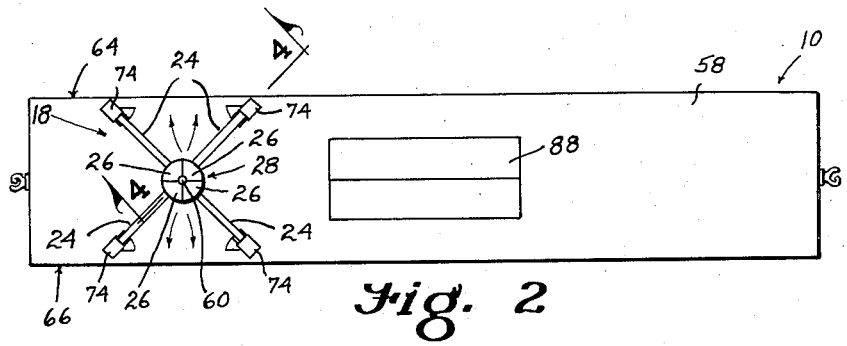
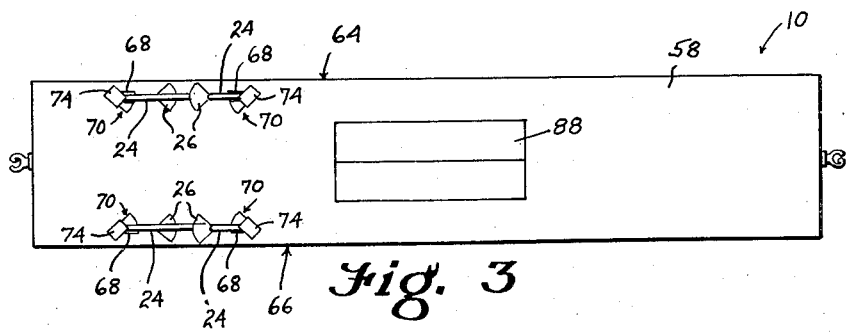
INVENTOR.
John Keener
BY
ATTORNEY.
Witness.
A. G. Martin Jan. 10, 1961  J. KEENER  2,967,492
TRAILER HITCH FOR A PIGGY-BACK RAILROAD FLAT CAR
Filed July 27, 1959  2 Sheets-Sheet 2

INVENTOR.
John Keener
BY

ATTORNEY.

Witness.
A. G. Martin

# United States Patent Office 2,967,492
Patented Jan. 10, 1961

2,967,492

TRAILER HITCH FOR A PIGGY-BACK RAILROAD FLAT CAR

John Keener, Des Moines, Iowa, assignor of thirty-three and one-third percent to George M. Clarkson and thirty-three and one-third percent to Gibson C. Holliday, both of Des Moines, Iowa Filed July 27, 1959, Ser. No. 829,648

20 Claims. (Cl. 105—368)

This invention relates to trailer hitches and more particularly to such hitches mountable on what is known as the piggyback railroad flat car now coming into increasing use for moving freight loaded semi-trailers by rail. In the piggyback flat car operation, the freight carrying semi-trailers must be backed into place by a suitable prime mover or tractor which is then detached so the trailer can be hitched or secured to the flat car. At the point of destination, another tractor will be backed into position for coupling engagement with the trailer to pull it to its delivery point.

I have previously designed other hitches of the type indicated and from observation of their use I find certain disadvantages which are overcome by this invention as will be pointed out. Present flat car hitches for holding semi-trailers being transported thereon, so far as I have observed, includes apparatus fixedly mounted to the flat car so as to project upwardly from the floor thereof but designed with the intended purpose of affording sufficient clearance for the undercarriage of the tractor and trailer in being moved there over. Such clearance is required since a train of piggyback cars may include a considerable number of such cars and all trailers are loaded from one end of the train. Thus as the loading commences, the first trailer must be backed or maneuvered over all of the cars to the first empty one and this necessitates safe negotiation past all upstanding hitch apparatus on the intermediate cars. Such procedure is repeated until all trailers are loaded on the cars. It will thus be apparent that both in loading and unloading, trailers and tractors must be moved past a great number of obstacles requiring skill and care by the tractor driver. In spite of the competence of such drivers, however, experience has clearly shown that damage to trailer and tractor brake air lines and other equipment occurs with a frequency that seriously interfers with the entire operation by causing delays and expense necessitated by the repairs required.

With the above observations in mind, one of the important objects contemplated by this invention is the provision of a trailer hitch on a railroad flat car that can be easily mounted to and removed from operable position on such car.

Another object inhering herein is the provision of a hitch of the above class that can, when mounted on the flat car, be moved to a position affording an unobstructed line of travel longitudinally of the car for trailers and tractors being driven on the same for purposes of loading or unloading the trailers and which, when the trailers are in place, can be selectively moved to and from a position of coupling engagement with the hitch or king pin on the trailer.

A further object is to provide storage means on a hitch equipped flat car as above characterized in which the hitch can be placed so as to leave the entire flat car surface free for carrying freight or the like in the event such car is not being used for piggyback transportation of a semi-trailer. In this regard, the hitch means can be carried by the car even if not in use so as to always be available if needed or desired at any terminal.

Still another object includes the provision of an improved hitch structure that materially enhances its efficiency over similar hitches and reduces the cost of maintenance and repair.

A still further object is to construct this new hitch from a plurality of interchangeable sections or units whereby economy in manufacture is obtained and the number of replacement parts to be maintained in reserve is at a minimum.

Other objects and advantages of this invention reside in the details of construction and correlation of the various parts and will be apparent as the description proceeds.

Figure 4:
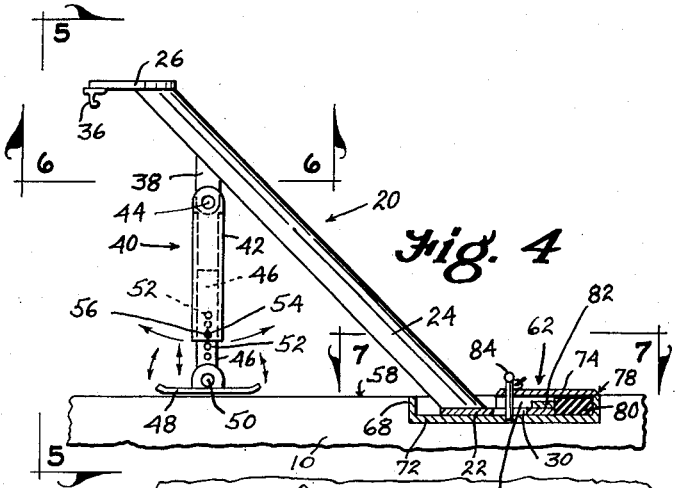
Figure 6:
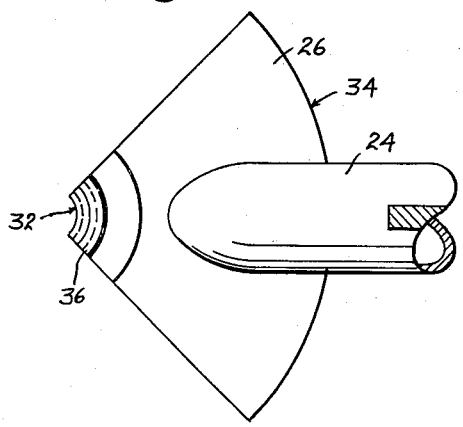
Figure 7:
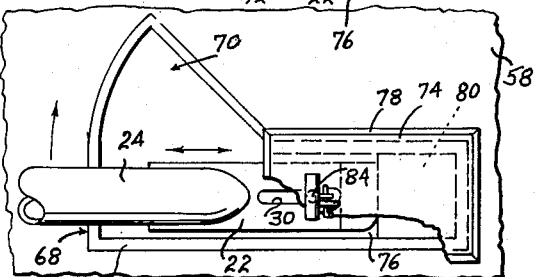
Figure 8:
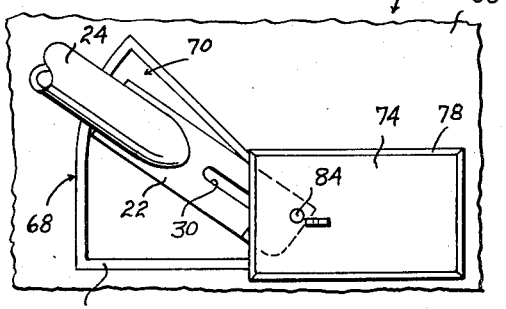

This invention consists of novel parts and combination of parts to be hereinafter described whereby the objects set forth are attained, as pointed out in the claims, and illustrated in the accompanying drawings, in which:

Fig. 1 is a side elevational view showing a semi-trailer loaded on a railroad flat car and secured to my new hitch mounted thereon, Fig. 2 is a plan view taken from the line 2—2 in Fig. 1 showing the hitch in operable position for engaging the king pin on the trailer, Fig. 3 is a plan view on the same line as Fig. 2 but showing the hitch sections moved to a position permitting unobstructed travel of a trailer and tractor longitudinally of the flat car, Fig. 4 is an enlarged elevational view, partly in section, of one component unit or section of my new hitch showing the same in relation to the floor or bed of the flat car, Fig. 5 is an end view taken from the line 5—5 of Fig. 4, Fig. 6 is an enlarged underside plan view taken from the line 6—6 in Fig. 4 to more clearly illustrate a quadrant of the top plate which is an integral part of each hitch unit or section, Fig. 7 is a plan view taken from the line 7—7 in Fig. 4 showing the mounting of this hitch to the flat car bed in its operable position of Fig. 2, and with portions of the view cut away to more clearly illustrate the construction thereof, and Fig. 8 is a similar to Fig. 7 but showing a hitch unit moved to the inoperable position of Fig. 3.

Referring to the drawings a railroad flat car of usual construction is designated generally by the numeral 10 and while some such cars may at times be provided with sideboards or curbs about the edges of the floor bet, the same are not material to this invention and thus are not shown. A semi-trailer indicated by the numeral 12 is likewise only illustrative of the equipment for which this invention is designed and no invention is claimed for either the car 10 or trailer 12. The landing gear and king pin on the trailer 12 are identified by the respective numerals 14 and 16 for clarity in the description which follows.

This new hitch indicated generally at 18 will, when operable, engage the king pin 16 on the trailer for securing the same in the same general relationship as such pin is attached to what is known as the fifth wheel on a tractor or prime mover. Hitch 18 as an operable device is composed of four like units or sections 20 (Fig. 4), each of which is interchangeable as to location and function with each of the other three and thus one spare section can be used as a replacement for any section damaged, lost or otherwise not available for use. It will thus be sufficient to describe in detail, the construction of only one section 20 and like numerals will be applied to like parts on the other sections.

With reference now more particularly to Figs. 4–8, the sectional unit 20 of this hitch 18 comprises a horizontally disposed foot 22 connected by an inclined leg 24 to a quadrant shaped top or hitch plate section 26 which is also horizontally disposed, spaced above foot 22 and offset relative to a vertical alignment therewith. While any suitable material may be used for section 20 to accomplish the purposes herein disclosed, I might point out that satisfactory results can be obtained by using five inch steel pipe for leg 24 and one inch steel plate material for members 22 and 26. Six by eighteen inches is suitable for foot 22 and quadrant 26 is preferably of a size that four will form a top plate 28 (Fig. 2) of approximately thirty inches in diameter as will later appear.

Foot 22 is provided with a longitudinal slot 30 intermediate the ends thereof and quadrant 26 is provided at its inner end with a radius 32 concentrically disposed relative to the outer perimeter 34. A hook member 36 is secured to the underside of quadrant 26 below the radius 32 as seen in Fig. 4. Intermediate foot 22 and quadrant 26 and preferably closer to the quadrant, a bearing member 38 is secured to leg 24 so as to depend therefrom in a vertical plane and to the depending end of member 38 there is pivotally secured one end of a depending leg assembly 40. This assembly is designed to be selectively longitudinally extensible and for this purpose I show a pipe length 42 pivotally secured at one end to bearing 38 by means of a pin 44 and adapted to telescopically receive a pipe or rod member 46 having on its outer or lower end a transversely disposed shoe 48 pivotally secured thereto by a pin 50 or the like. Member 46 is provided with a plurality of longitudinally spaced transverse holes 52 which can be selectively placed in registering position with a transverse hole 54 in member 42 and secured in any selected position by a pin 56.

Thus far described, it is pointed out that four section 20 units are placed at a selected point on the top surface 58 of flat car 10 as shown in Fig. 2 so that quadrants 26 combine to form the circular top plate 28 having a center opening 60 formed by the radii 32 for engagement with the king pin 16 on trailer 12 as will later appear. In so arranging units 20, the means for positioning them relative to the floor or bed 58 on car 10 is an important feature of this invention which I shall now describe.

Each foot 22 is slidable in and pivotable relative to a socket construction in floor 58 which is designated generally by the numeral 62 in Fig. 4 and as seen in Fig. 2 there will be four such socket units equally spaced in radial relationship to hole 60 when units 26 are assembled as previously mentioned. In such arrangement (Fig. 2) two such sockets will be closely adjacent one side 64 of car 10 and spaced longitudinally relative thereto and the other two will be similarly positioned in relation to the opposite side 66 of car 10. Socket unit 62 is formed by providing a generally elongated well 68 in floor 58 widened at one end portion in one direction as indicated at 70, and such widened portion on each respective pair of socket units adjacent a common car edge 64 or 66 extend toward each other. Wells 68 are so placed that each is diametrically opposite to one of the others relative to plate 28 and the longitudinal axes of such oppositely disposed wells are in alignment with each other. Preferably I have lined the sides and bottom of well 68 with steel plating 72 which may be accomplished by forming a box-like member to conform to the shape of the well. Such a lining or box is not necessarily required but is deemed desirable to protect floor 58 against wear and damage. A steel plate or other suitable flat cover 74 is secured over the outer end portion of well 68 to form the chamber 76 and the outer edges of such plate are preferably bevelled or rounded 78. A yielding member preferably in the form of a resilient rubber pad or block 80 is placed at the inner end of chamber 76 and foot 22 is disposed in well 68 so that its outer end which is reinforced as shown at 82 extends into chamber 76 and is in abutting engagement with block 80. Foot 22 is removably secured in socket 62 by means of a pin 84 connectible through foot slot 30 to cover 74 and the floor of well 68 or the liner therein. As seen in Fig. 4, foot 22 is shorter than the length of well 68 in order to permit certain longitudinal movement of the foot as will become apparent and with each hitch section 20 constructed and arranged as here disclosed, this hitch can be used as follows.

Prior to loading a trailer 12 on the flat car 10, each unit 20 can be manually maneuvered so that foot 22 moves slightly longitudinally relative to well 68 toward the inner end thereof whereby such unit can be pivoted on pin 84 toward the widened side 70 of the well. In this position such units adjacent a common car side will rest in a generally inclined position relative to a horizontal plane but extend towards each other and overlap in longitudinal alignment in a plane generally parallel to the respective car sides 64 and 66 to leave the center area of the car free of any obstructions for the passage of the trailer and tractor. The reinforced end 82 of foot 22 in this position will bear against the underside of cover 74 (Fig. 8) to hold section 20 in inclined position as described. The trailer is then placed in piggyback position (Fig. 1) and in practice to facilitate this operation, suitable marks (not shown) can be placed on the car 10 for the benefit of the tractor driver. Sections 20 are then manually maneuvered into the position shown in Fig. 1 and the hinge action obtainable on foot 22 by reason of slot 30 and pin 84 affords sufficient play to adjust quadrants 26 in their respective abutting positions to form plate 28 with the surfaces 32 defining hole 60 nested in the usual peripheral groove (not shown) in the king pin 16. A ratchet operated cable loop apparatus of a type commercially available as represented here by the number 86 (Fig. 1) is then applied to the four hooks 36 on the respective quadrants 26 and securely tightened whereby such quadrants are as effectively secured to the king pin as if they were a solid plate and thus serves the same purpose. The trailer 12 may otherwise be anchored to the car 10 by anti-sway chains and the like in a well-known manner. To remove the trailer, the procedure just described is reversed.

As pointed out earlier, there may be times when it is desirable to use car 10 for purposes other than carrying trailers 12. Heretofore, the presence of fixed hitch apparatus on the car 10 has not made this feasible since regular flat car construction does not lend itself to carrying a load over one set of wheels. With my hitch construction, however, each section 20 can be completely removed by removing pin 84 and I have provided a storage compartment 88 which may be of any suitable construction to be built into the car 10 and provided with a closure flush with floor 58. Such a compartment will carry all sections 20 including, spares, and by storing my hitch therein, the car 10 can be utilized for a full freight load in a manner not possible under present type piggyback hitching assemblies.

In addition to the advantages for this hitch 18 above described, it is pointed out that it is much improved over other hitches designed for the same purpose in reducing and for all practical purposes eliminating damage to the king pin 16 from shock forces which result when cars 10 are being coupled or the train of cars is started in motion. Under such conditions, the rigidity of attachment of presently used hitch assemblies to the flat cars appears to transmit such shock force directly to the king pin sufficiently that damage to such pins has frequently occurred. In my hitch structure, such shocks are transmitted through legs 24 and 40 to the car floor 58 and the presence of the resilient pad 80 in chamber 76 provides a shock absorbing action when this occurs. The use of springs in place of pads 80 may be employed but resilient pads as described are preferable since they appear more efficient in absorbing shocking forces transmitted thereto whereas springs have a tendency to rebound with a resulting return transmission of force and thus produce an oscillating travel of shock forces until they subside.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. In a trailer hitch construction for use on a railroad flat car for securing in piggyback position thereon a wheeled trailer equipped with hitch attaching means, said trailer hitch comprising a plurality of like hitch sections each of which includes a horizontally disposed hitch plate section, a horizontally disposed foot member spaced below said hitch plate section and off-set relative to a vertical alignment therewith, a leg diagonally positioned relative to a horizontal plane and connected at respective ends to said hitch plate section and said foot member, said hitch sections positionable on the flat car after the trailer is in place thereon so that said hitch plate sections are cooperatively engaged with each other to define a unitary hitch plate in engaging relationship with the hitch attaching means on said trailer, means to releasably secure said hitch plate sections as a unitary hitch plate, and means to removably secure said foot members to the bed of said flat car.

2. In a trailer hitch construction for use on a railroad flat car for securing in piggyback position thereon a wheeled trailer equipped with hitch attaching means, said trailer hitch comprising a plurality of like hitch sections each of which includes a horizontally disposed hitch plate section, a horizontally disposed foot member spaced below said hitch plate section and off-set relative to a vertical alignment therewith, a leg diagonally positioned relative to a horizontal plane and connected at respective ends to said hitch plate section and said foot member, said hitch sections positionable on the flat car after the trailer is in place thereon so that said hitch plate sections are cooperatively engaged with each other to define a unitary hitch plate in engaging relationship with the hitch attaching means on said trailer, means to releasably secure said hitch plate sections as a unitary hitch plate, and means to removably secure said foot members to the bed of said flat car in yielding relationship thereto.

3. A device as defined in claim 1 including a second leg pivotally depending from said first mentioned leg and adapted at its lower end for bearing engagement with the bed of the flat car, and means on said second leg for selectively varying the length thereof.

4. In a trailer hitch construction for use on a railroad flat car for securing in piggyback position thereon a wheeled trailer equipped with hitch attaching means, said trailer hitch comprising a plurality of like hitch sections each of which includes a horizontally disposed hitch plate section, a horizontally disposed foot member spaced below said hitch plate section and off-set relative to a vertical alignment therewith, a leg diagonally positioned relative to a horizontal plane and connected at respective ends to said hitch plate section and said foot member, each hitch plate section having a like radius at corresponding points on corresponding edges, said hitch sections positionable on the flat car after the trailer is in place thereon so that said hitch plate sections are in a cooperative abutting relationship with each other whereby said radii define an opening for embracing the hitch attaching means on said trailer, means to releasably secure said hitch plate sections as a unitary hitch plate, and means to removably yieldingly secure said foot members to the bed of said flat car.

5. In a trailer hitch construction for use on a railroad flat car for securing in piggyback position thereon a wheeled trailer equipped with hitch attaching means, said trailer hitch comprising a plurality of like hitch sections each of which includes a leg diagonally disposed relative to a horizontal plane, the upper end of said leg carrying a segment of a hitch engaging assembly, the lower end of said leg having means for removable yielding attachment to the bed of the flat car, said hitch sections assembleable so that said segments are in cooperative engagement with each other to form a hitch plate engageable with the hitch attaching means on the trailer, and means to releasably secure said segments in such operable position.

6. In a trailer hitch construction for use on a railroad flat car for securing in piggyback position thereon a wheeled trailer equipped with hitch attaching means, said trailer hitch comprising a plurality of like hitch sections each of which includes a leg diagonally disposed relative to a horizontal plane, the upper end of said leg carrying a segment of a hitch engaging assembly, the lower end of said leg having means for removable yielding attachment to the bed of the flat car, said hitch sections assembleable so that said segments are in cooperative engagement with each other to form a hitch plate engageable with the hitch attaching means on the trailer, means to releasably secure said sements in such operable position, and a longitudinally extensible second leg operably connected to said first mentioned leg and adapted for bearing engagement with the bed of the flat car.

7. In combination with a railroad flat car, a trailer hitch assembly for securing a wheeled trailer in piggyback position on said car, said trailer being of the type having a king pin of well known construction for hitch attaching purposes, said hitch assembly comprising a plurality of like hitch sections each of which includes a horizontally disposed hitch plate section, a horizontally disposed foot member spaced below said hitch plate section and off-set relative to a vertical alignment therewith, a leg diagonally positioned relative to a horizontal plane and connected at respective ends to said hitch plate section and said foot member, a second leg pivotally depending from said first mentioned leg and adapted at its lower end for bearing engagement with the bed of the flat car, means on said second leg for selectively varying the length thereof, the bed of said flat car provided with a plurality of equally spaced wells concentrically disposed relative to a common axis point, a cover over a portion of each respective well to provide a chamber with a closed end, a yielding member in the closed end of each chamber, a foot member in each respective chamber in abutting engagement with the yielding member therein, said first mentioned legs in converging relationship with each other whereby said hitch plate sections are in cooperative engagement with each other to form a hitch plate engaging said king pin, and means to releasably secure said hitch plate sections in such king pin engaging position.

8. A device as defined in claim 7 wherein the yielding member in said chamber is a block of resilient rubber.

9. In a trailer hitch construction for use on a railroad flat car for securing in piggyback position thereon a wheeled trailer equipped with hitch attaching means, said trailer hitch comprising a plurality of like hitch sections each of which includes a horizontally disposed hitch plate section, a horizontally disposed foot member spaced below said hitch plate section and off-set relative to a vertical alignment therewith, a leg diagonally positioned relative to a horizontal plane and connected at respective ends to said hitch plate section and said foot member, each hitch plate section having a like radius at corresponding points on corresponding edges, said hitch sections positionable on the flat car after the trailer is in place thereon so that said hitch plate sections are in a cooperative abutting relationship with each other whereby said radii define an opening for embracing the hitch attaching means on said trailer, means to releasably secure said hitch plate sections as a unitary hitch plate, and means to pivotally secure said foot members to the bed of said flat car.

10. In a trailer hitch construction for use on a railroad flat car for securing in piggyback position thereon a wheeled trailer equipped with hitch attaching means, said trailer hitch comprising a plurality of like hitch sections each of which includes a segment of a hitch engaging plate, a leg angularly disposed relative to said segment and secured at one end thereto, means to removably secure the other ends of said legs to said flat car in equally spaced concentric relationship whereby said segments are in cooperative contact with each other forming a hitch plate engaging the hitch attaching means on said trailer, means releasably securing said segments in such engaging position, and said hitch sections constructed and arranged to be mounted as described after said trailer is in place on said flat car.

11. A device as defined in claim 7 wherein said wells are positioned so as to be clear of that portion of said flat car over which said trailer will move at times, and means pivotally slidably attaching said foot members to said respective covers whereby said hitch sections can be moved on said pivot point to a position clear of said portion of the flat car over which said trailers will be moved.

12. In combination with a railroad flat car, a trailer hitch assembly for securing a wheeled trailer in piggyback position on said car, said trailer being of the type having a king pin of well known construction for hitch attaching purposes, said hitch assembly comprising a plurality of like hitch sections each of which includes a segment of a king pin engaging plate and a flat car floor engaging member operably connected thereto said segment assembleable in abutting relationship with each other to form a unitary king pin engaging plate, means to releasably secure said segments in king pin engaging position, and means to yieldingly secure said floor engaging members to the floor of said flat car in a predetermined relationship.

13. In combination with a railroad flat car, a trailer hitch assembly for securing a wheeled trailer in piggyback position on said car, said trailer being of the type having a king pin of well known construction for hitch attaching purposes, said hitch assembly comprising a plurality of like hitch sections each of which includes a segment of a king pin engaging plate and a flat car floor engaging member operably connected thereto said segments assembleable in abutting relationship with each other to form a unitary king pin engaging plate, means to releasably secure said segments in king pin engaging position, and means to pivotally secure said floor engaging members to the floor of said flat car whereby said segments can be selectively moved into and out of their king pin engaging position.

14. In a trailer hitch construction for use on a railroad flat car for securing in piggyback position thereon a wheeled trailer equipped with hitch attaching means, said trailer hitch comprising a plurality of like hitch sections each of which includes a leg adapted for diagonal disposition relative to a horizontal plane and having an upper and lower end respectively, a segment of a hitch plate carried by said upper end, support means intermediate the upper and lower ends of said leg, means to pivotally secure the lower ends respectively of said legs at spaced points on the bed of a flat car whereby said segments converge into cooperative abutting relationship to form a unitary hitch plate engaging said hitch attaching means on said trailer, means to releasably secure said segments in such hitch plate position, and said legs movable on their respective pivot points whereby they can be positioned to be free from that area of the flat car over which a trailer will be moved at times.

15. A device as defined in claim 14 including shock absorbing means at the point of attachment of said legs to the bed of the flat car.

16. In a trailer hitch construction for use on a railroad flat car for securing in piggyback position thereon a wheeled trailer equipped with hitch attaching means, said trailer hitch comprising a plurality of like hitch sections each of which includes a leg adapted for diagonal disposition relative to a horizontal plane and having an upper and lower end respectively, a segment of a hitch plate carried by said upper end, support means intermediate the upper and lower ends of said leg, means to pivotally secure the lower ends respectively of said legs at spaced points on the bed of a flat car whereby said segments converge into cooperative abutting relationship to form a unitary hitch plate engaging said hitch attaching means on said trailer, means to releasably secure said segments in such hitch plate position, and said legs selectively movable on their respective pivot points or removable therefrom whereby they can be positioned to be free from that area of the flat car over which a trailer will be moved at times.

17. In a trailer hitch construction for use on a railroad flat car for securing in piggyback position thereon a wheeled trailer equipped with hitch attaching means, said trailer hitch comprising a plurality of like hitch sections each of which includes a leg adapted for diagonal disposition relative to a horizontal plane and having an upper and lower end respectively, a segment of a hitch plate carried by said upper end, support means intermediate the upper and lower ends of said leg, means to pivotally secure the lower ends respectively of said legs at spaced points on the bed of a flat car whereby said segments converge into cooperative abutting relationship to form a unitary hitch plate engaging said hitch attaching means on said trailer, means to releasably secure said segments in such hitch plate position, said legs selectively movable on their respective pivot points or removable therefrom whereby they can be positioned to be free from that area of the flat car over which a trailer will be moved at times, and shock absorbing means at the point of attachment of said legs to the bed of the flat car.

18. In a trailer hitch construction for use on a railroad flat car for securing in piggyback position thereon a wheeled trailer equipped with hitch attaching means, said trailer hitch comprising a plurality of individual hitch sections of identical construction, each section consisting of a horizontally disposed hitch plate segment, a horizontally disposed foot member spaced below said hitch plate segment and off-set relative to a vertical alignment therewith, and a leg diagonally positioned relative to a horizontal plane and connected at respective ends to said hitch plate segment and said foot member, said hitch sections being disposed on a railroad car so that said legs converge to associate said hitch plate segments into a unitary hitch plate king pin engaging member, means releasably securing said hitch plate segments in king pin engaging position, respective means slidably yieldingly engaging each respective foot member with the floor of said railroad car, and said hitch sections being interchangeable as to position of use on said railroad car.

19. In a trailer hitch construction for use on a railroad flat car for securing in piggyback position thereon a wheeled trailer equipped with hitch attaching means, said trailer hitch comprising a plurality of individual sectional hitch units each of which are of like construction and consists of an elongated diagonal leg having a quadrant shaped hitch plate segment on one end and a flat foot on the other end, said hitch plate segment and flat foot being on parallel vertically spaced horizontal planes and projecting respectively in opposite directions from the respective ends of said leg, the projecting end of said hitch plate segment being the apex thereof and defining a radius, said feet being disposed in a spaced concentric pattern on the floor of a railroad car so that said legs converge to associate said hitch plate segments in abutting relationship to form a unitary hitch plate with said radii defining a king pin engaging socket, a depending hook on each hitch plate segment, means releasably engaging said hooks to hold said hitch plate segments in a unitary hitch plate position, and means slidably yielding engaging said feet with the floor of the railroad car.

20. In combination with a railroad flat car, a trailer hitch assembly for securing a wheeled trailer in piggyback position on said car, said trailer being of the type having a king pin of well known construction for hitch attaching purposes, said hitch assembly comprising a plurality of like hitch sections each of which includes a horizontally disposed hitch plate section, a horizontally disposed foot member spaced below said hitch plate section and off-set relative to a vertical alignment therewith, said foot member provided with an elongated slot, a leg diagonally positioned relative to a horizontal plane and connected at respective ends to said hitch plate section and said foot member, the bed of said flat car provided with a plurality of equally spaced elongated wells concentrically disposed relative to a common axis point and having their longitudinal axes in radial alignment with said axis point, a cover over the remote portion of each respective well relative to said axis point to provide a chamber with a closed end, a yielding member in the closed end of each chamber, said cover provided with a longitudinal slot in radial alignment with said axis point, a foot member in each respective chamber in abutting engagement with the yielding member therein, a removable pin extending between said cover and the bottom of said well and through the slot in said foot member so that said foot member is slidable longitudinally of said well within the limits of said slot and laterally pivotal relative to said well, said legs in converging relationship with each other whereby said hitch plate sections are in cooperative engagement with each other to form a hitch plate engaging said king pin, and means to releasably secure said hitch plate sections in such king pin engaging position.

References Cited in the file of this patent

UNITED STATES PATENTS

| | | |
|---|---|---|
| 1,934,165 | Butterworth | Nov. 7, 1933 |
| 2,036,344 | Menhall | Apr. 7, 1936 |
| 2,164,662 | Nampa | July 4, 1939 |
| 2,837,038 | Fahland | June 3, 1958 |
| 2,846,172 | Gutridge et al. | Aug. 5, 1958 |
| 2,880,681 | Markestein et al. | Apr. 7, 1959 |